(12) United States Patent
Nishijima et al.

(10) Patent No.: US 6,282,465 B1
(45) Date of Patent: Aug. 28, 2001

(54) DRIVING FORCE CONTROL FOR AUTOMOTIVE VEHICLE

(75) Inventors: Hiroaki Nishijima, Yokohama; Nobusuke Toukura, Kanagawa; Masayuki Yasuoka, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/521,660

(22) Filed: Mar. 8, 2000

(30) Foreign Application Priority Data

Mar. 8, 1999 (JP) .................................................. 11-060181

(51) Int. Cl.$^7$ .................................................. B60K 41/22
(52) U.S. Cl. ............................... 701/1; 477/120; 701/101
(58) Field of Search ................................. 701/1, 54, 70, 701/95, 101, 76, 58, 51, 64, 84, 85; 73/146; 180/170, 179, 197, 282; 477/120, 902, 107, 110, 115, 118

(56) References Cited

U.S. PATENT DOCUMENTS

| | | | |
|---|---|---|---|
| 5,216,608 | * | 6/1993 | Ito et al. .......................... 364/426.03 |
| 5,231,582 | * | 7/1993 | Takahashi et al. ................ 364/424.1 |
| 5,465,208 | * | 11/1995 | Mochizuki et al. ............. 364/426.01 |
| 5,655,995 | * | 8/1997 | Kondo et al. .......................... 477/155 |
| 5,806,009 | * | 9/1998 | Horiguchi ............................... 701/58 |
| 5,925,087 | * | 7/1999 | Ohnishi et al. ......................... 701/70 |
| 6,029,107 | * | 2/2000 | Sato ....................................... 701/58 |
| 6,104,976 | * | 8/2000 | Nakamura ............................. 701/95 |

FOREIGN PATENT DOCUMENTS

| | | |
|---|---|---|
| 8-219242 | 8/1996 | (JP) . |
| 9-242862 | 9/1997 | (JP) . |
| 9-286261 | 11/1997 | (JP) . |
| 10-266882 | 10/1998 | (JP) . |

* cited by examiner

Primary Examiner—Tan Nguyen
Assistant Examiner—Dalena Tran
(74) Attorney, Agent, or Firm—Foley & Lardner

(57) ABSTRACT

A driving force control system for an automotive vehicle comprises a vehicle speed sensor detecting an operating parameter indicative of a speed of the vehicle and generating a vehicle speed signal indicative of said detected operating parameter. An ordinary target driving force generator determines an ordinary target driving force in response to operator manipulation of the accelerator pedal and the vehicle speed. The ordinary target driving force is a predetermined target value of driving force required to keep the vehicle rolling over the surface of a flat road that has 0% gradient. A running resistance increment generator determines an increment in running resistance from a standard resistance that is indicated by the ordinary target driving force. A corrected target driving force generator receives the ordinary target driving force, the vehicle speed and the running resistance increment. It determines corrected target driving force. The corrected target driving force generator keeps setting the ordinary target driving force as the corrected target driving force when the vehicle speed signal is low.

13 Claims, 11 Drawing Sheets

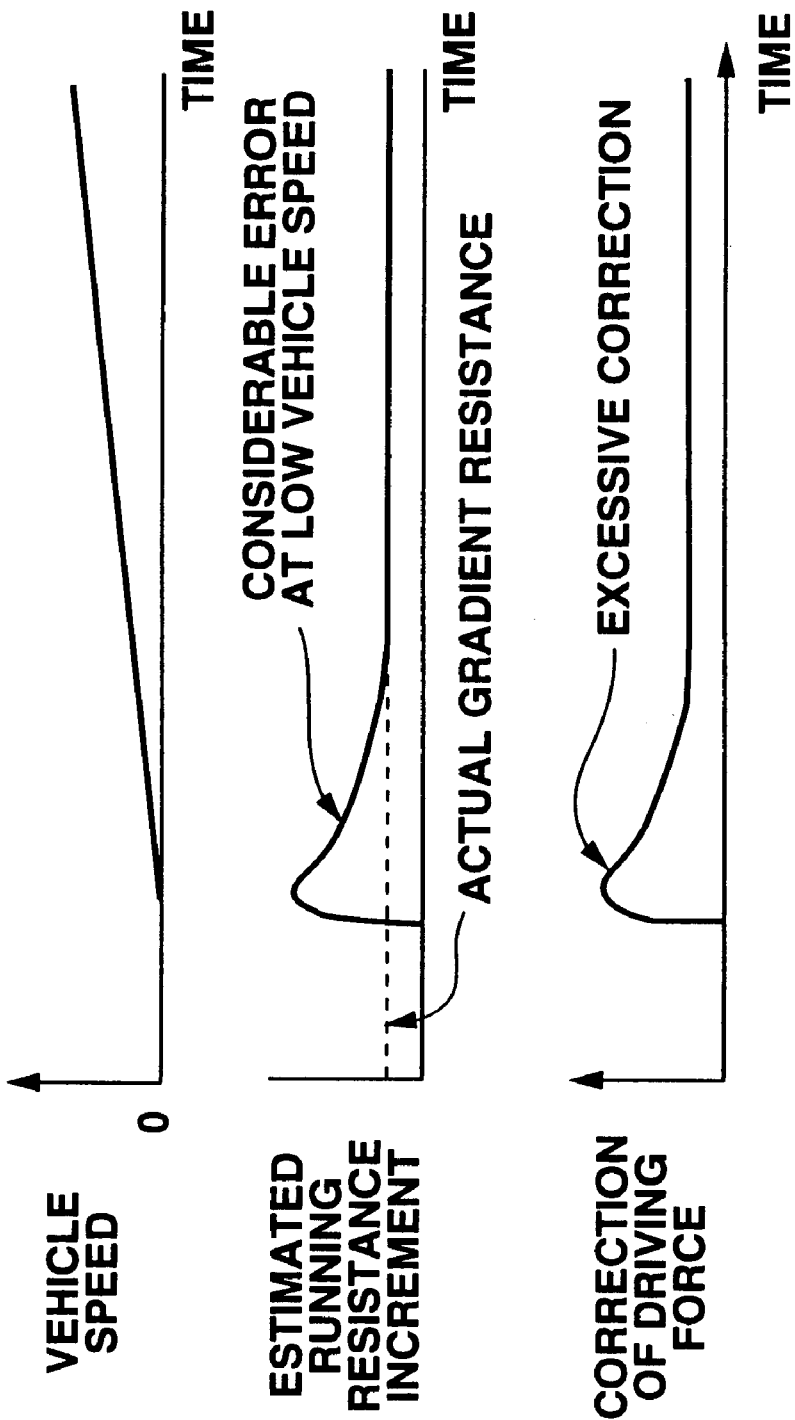

DRIVING FORCE CONTROL FOR AUTOMOTIVE VEHICLE

FIELD OF THE INVENTION

The present invention relates to a driving force control for an automotive vehicle.

BACKGROUND OF THE INVENTION

The term "standard resistance" or "standard running resistance" is herein used to mean any force which opposes the motion of an automotive vehicle which is driven to keep rolling over the surface of a flat road having 0% gradient at a constant vehicle speed. The term "running resistance" is herein used to mean any force which opposes the motion of an automotive vehicle which is driven to keep rolling over the surface of a road at a constant vehicle speed. Running resistance is equal to standard resistance if an automotive vehicle is driven to keep rolling over the surface of a flat road having 0% gradient at a constant vehicle speed. Running resistance increases and becomes greater than standard resistance if the automotive vehicle is accelerated to increase speed from the constant vehicle speed. The term "acceleration resistance" is herein used to mean this increment or difference in running resistance that has occurred due to acceleration. Running resistance is greater when the automotive vehicle is driven to keep rolling over the surface of a flat road having gradient greater than 0% at a constant vehicle speed than standard resistance for the same vehicle speed. The term "gradient resistance" is used to mean this increment or difference in running resistance.

JP-A 9-242862 discloses a vehicle control system in which a speed ratio between an input shaft and an output shaft of an automatic transmission is controlled in response to road gradient, throttle opening degree, and vehicle speed. In order to estimate road gradient of a road, over which the vehicle is rolling, a road gradient torque (Tα) is determined by subtracting from a driving torque (To) a sum of a flat road running resistance torque (Tr) and an acceleration resistance torque (Tα). A characteristic of variation of flat road running resistance torque (Tr) against variation of vehicle speed is mapped. This mapped data are retrieved using a current reading point of vehicle speed to give a value of flat road running resistance torque (Tr).

JP-A 9-286261 teaches combining a traction control system with an anti-lock brake system. In this case, operation of the traction control system is suspended when estimated vehicle speed drops below a predetermined value during deceleration to avoid coincidence of the two control systems.

JP-A 10-266882 teaches using a map to accomplish smooth variation in driving force with variation in throttle opening degree for a small throttle opening degrees falling in a small range. The map contains various target values in driving force against various values in throttle opening degree. The setting is such that, for the small range of throttle opening degrees, a change in the target values in driving force against a change in throttle opening degree is small.

In the case where the estimated output torque and vehicle speed are used in determining gradient resistance, the calculation accuracy of the gradient resistance depends on the detection accuracy of the vehicle speed. However, during operation at low vehicle speeds, the detection accuracy of the vehicle speed becomes very low due to low revolution speeds of the drive shaft at low vehicle speeds. Thus, high calculation accuracy of the gradient resistance is not expected during operation at low vehicle speeds, allowing overestimation of driving force at low vehicle speeds as the vehicle move off from a standstill as shown in FIG. 11. This overestimation causes an excessive increase in correction of driving force, deteriorating ride feel of the vehicle operator.

JP-A 8-219242 discloses a driving force control system wherein a vehicle speed sensor detects revolution speed of a transmission output shaft and a change with respect to time of varying vehicle speed is calculated to give a vehicle acceleration. The vehicle acceleration is used to calculate gradient resistance as well as rolling resistance, air resistance and drive torque. The calculated gradient resistance plays an important role in varying ratio chance characteristic to provide driving force to meet varying road gradient. During operation at low vehicle speeds, a low level of detection accuracy of vehicle speed may cause an undesired change in driving force.

An object of the present invention is to provide a driving force control that prevents occurrence of undesired change in driving force during operation at low vehicle speeds.

SUMMARY OF THE INVENTION

According to one aspect of the present invention, there is provided a driving force control system for an automotive vehicle having an accelerator pedal and a powertrain including an internal combustion engine, comprising:

a vehicle speed sensor detecting an operating parameter indicative of a speed of the vehicle and generating a vehicle speed signal indicative of a said detected operating parameter;

an ordinary target driving force generator determining an ordinary target driving force in response to operator manipulation of the accelerator pedal and said vehicle speed indicated by said vehicle speed signal and generating an ordinary target driving force signal indicative of said determined ordinary target driving force, said ordinary target driving force being a predetermined target value of driving force required to keep the vehicle rolling over the surface of a flat road that has 0% gradient;

a running resistance increment generator determining an increment in running resistance from a standard resistance that is indicated by said ordinary target driving force and generating a running resistance increment signal indicative of said determined increment in running resistance;

a corrected target driving force generator receiving said ordinary target driving force signal, said vehicle speed signal and said running resistance increment signal determining corrected target driving force, and generating said determined corrected target driving force, said corrected target driving force generator being operative to keep setting said ordinary target driving force signal as said corrected target driving force signal when said vehicle speed signal is in a predetermined state.

BRIEF DESCRIPTION OF THE DRAWINGS

FIG. 11 is a graphical representation of operation of the before discussed prior art driving force control system.

DESCRIPTION OF THE PREFERRED EMBODIMENTS

Figure 1:
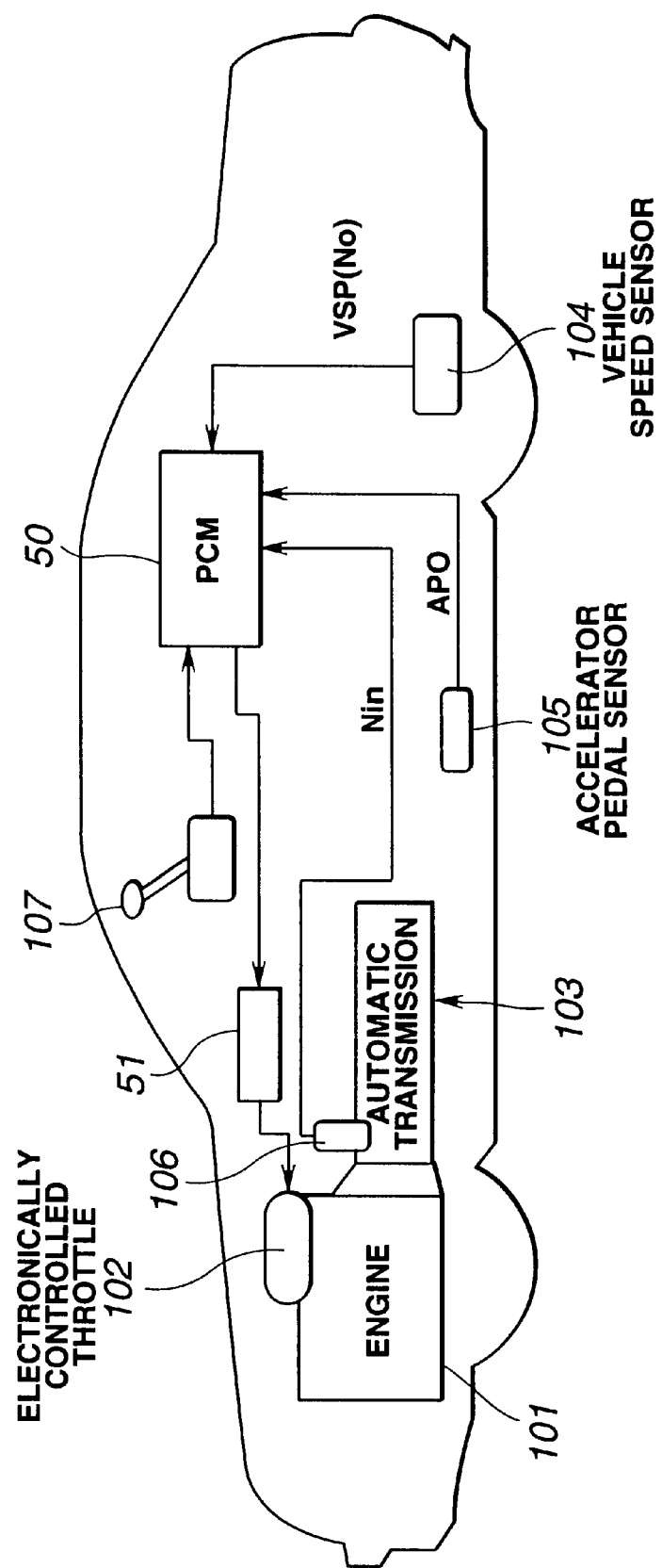
FIG. 1 is a block diagram of an automotive vehicle equipped with a powertrain control module (PCM) implementing the present invention.

Referring to the accompanying drawings, FIG. 1 illustrates an automotive vehicle having a powertrain including an internal combustion engine 101 with a throttle or throttle valve that opens in degrees. An automatic transmission 103 includes a torque converter. In a conventional manner, the automatic transmission 103 is drivingly connected to the engine 101 with the torque converter situated between the engine output shaft and the transmission input shaft. A speed ratio between revolution speed of the transmission input shaft and revolution speed of the transmission output shaft is variable. The reference numeral 50 indicates a powertrain control module (PCM). The PCM 50 controls output of the engine 101 and the speed ratio of the automatic transmission 103 to cause the power train to produce optimum driving force in response to running state.

An accelerator pedal opening (APO) sensor 105 serves as a device to detect manipulated position of an accelerator pedal by a vehicle operator. The APO sensor 105 detects amount of depression of the accelerator pedal APO by the vehicle operator and generates an APO signal indicative of the detected APO. An inhibitor switch detects which one of ranges is selected by a range selector lever 107 and generates a select signal indicative of the detected range selected. A vehicle speed sensor 104 detects revolution speed of the transmission output shaft as an operating parameter indicative of vehicle speed VSP and generating a vehicle speed signal indicative of the detected operating parameter. An input shaft revolution speed sensor 106 detects revolution speed of an input shaft of the transmission 103 and generates input shaft revolution speed signal indicative of the detected input shaft evolution speed IMPREV. The APO signal, select signal, vehicle speed signal, and input shaft revolution speed signal are fed to the PCM 50. The PCM 50 generates a fuel injection command and a spark timing command. In response to the fuel injection and spark timing commands, the engine 101 adjusts fuel injection quantity and spark timing. The PCM 50 also generates a ratio command. In response to the ratio command, the automatic transmission 103 adjusts the speed ratio. The PCM 50 adjusts a driving force of the vehicle using the fuel injection quantity command, spark timing command, and ratio command.

Disposed within an intake passage of the engine 101 is an electronically controlled throttle valve 102, which is opened by an actuator that is connected to a throttle control module (TCM) 51. In response to a throttle valve opening command signal from the PCM 50, the TCM 51 adjusts, via the actuator, the opening degree of the throttle valve 102.

The automatic transmission 103 is in the form of a continuously variable transmission (CVT) in which a ratio is continuously variable in response to the ratio command from the PCM 50. Multiplying a predetermined constant with vehicle speed VSP that is detected by the vehicle speed sensor 104 gives output shaft revolution speed OUPREV. Input shaft revolution speed IMPREV that is detected by the speed sensor 106 and output shaft revolution speed OUPREV are used to calculate a ratio of IMPREV to OUPREV. This calculated ratio is used as a speed ratio RATIO, i.e., RATIO=IMPREV/OUPREV, of the transmission 103. An input element of a ratio control mechanism of the CVT is activated in a direction to reduce a deviation of the ratio RATIO from the ratio command from the PCM 50.

Figure 2:
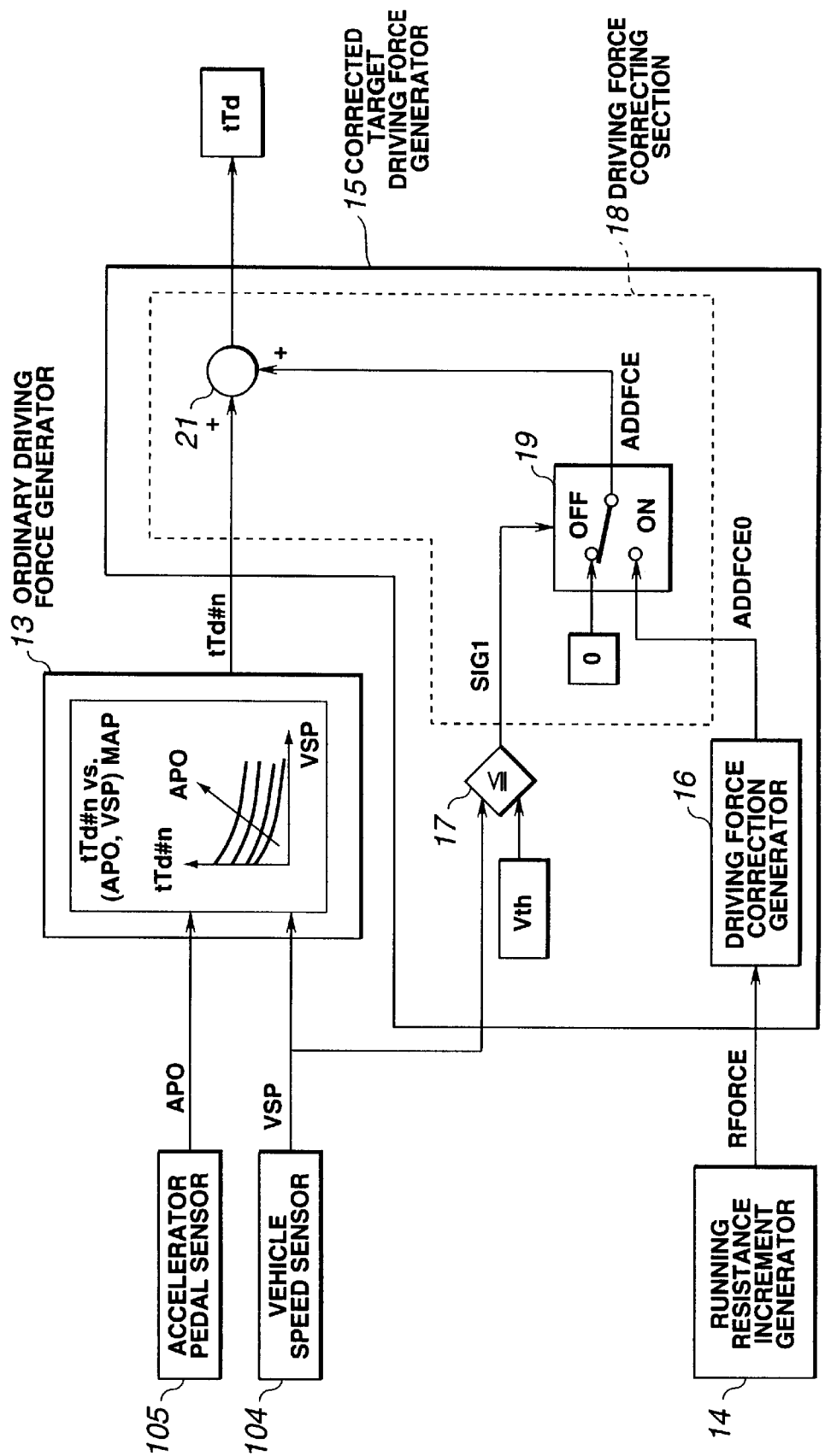
FIG. 2 is a control diagram illustrating the first preferred implementation of the present invention.

FIG. 2 is a block diagram illustrating on example of a driving force control performed within the PCM 50. Control strategy employed provides an increase of driving force in accordance with an increase in running resistance. Besides, the PCM 50 controls suspension of driving force correction in response to detected value of VSP.

In FIG. 2, the reference numeral 13 designates an ordinary target driving force generator (OTDFG). The OTDFG 13 inputs information as to APO and VSP from the sensors 105 and 104, respectively. The OTDFG 13 stores a tTd#n vs.(APO, VSP) map. This map contains various values of tTd#n against various combinations of values of APO and values of VSP. The values of tTd#n are indicative of target values of driving force required to keep the vehicle rolling over the surface of a flat road that has 0% gradient. The OTDFG 13 performs a table look-up operation of the map using the detected values of APO and VSP to determine a value of tTd#n, and generates the determined value of tTd#n. The reference numeral 14 designates a running resistance increment (RRIG). The RRIG 14 determines an increase over a standard running resistance and generates the determined increase as a running resistance increment RFORCE. The reference numeral 15 designates a corrected target driving force generator (CTDFG). The RFORCE and VSP are fed, as inputs, to the CTDFG 15.

The CTDFG 15 includes a driving force correction generator (DFCG) 16 that generates a preliminary target driving force correction ADDFCE0 and a driving force correcting section (DFCS) 18. The DFCS 18 includes a switch 19 and a summation point 21. Values of ADDFCE0 are predetermined against values of RFORCE and may be stored as a map in memory of the DFCG 16. ADDFCE0 and 0(zero) are you as two inputs to the switch 19. The switch 19 generates, as output, a target driving force correction ADDFCE. The switch 19 has an OFF position in which ADDFCE is set equal to 0 and an ON position in which ADDFCE is seat equal to ADDFCE0. In response to a comparison result indicative flag SIG1 resulting from comparison at a comparator 17 between VSP and a predetermined value Vth, the switch 19 takes OFF or ON position. ADDFCE is used as an input to the summation point 21. At the summation point 21, ADDFCE is added to tTd#n to give corrected target driving force tTd.

The comparator 17 comapres VSP with Vth and sets the flag SIG1 to OFF level when VSP is less than or equal to Vth (VSP≦Vth) and to ON level when VSP is greater than Vth (VSP>Vth). The predetermined value Vth falls in a low vehicle speed range from 5 km/h to 20 km/h.

The switch 19 allows addition of ADDFCE0 to tTd#n when the flag SIG1 is at ON level and thus VSP is greater than Vth (VSP≦Vth), while it prohibits this operation by setting ADDFCE0 to 0 (zero) when the flag SIG1 is at OFF level and thus VSP is less than or equal to Vth (VSP≦Vth). Thus, the correction of tTd#n by ADDFCE0 in response to the running resistance increment RFORCE is prohibited when VSP is less than or equal to Vth.

Figure 3:
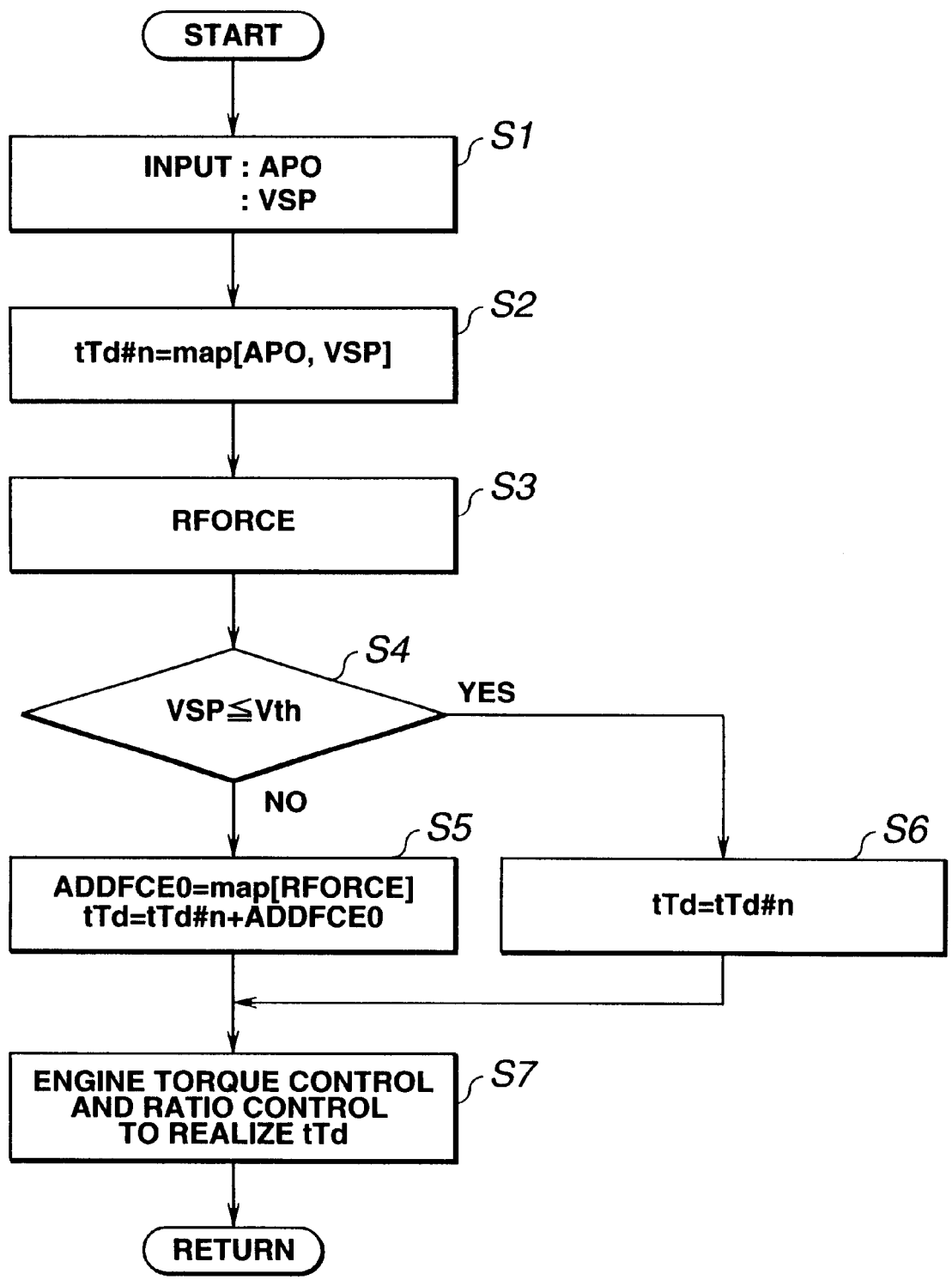
FIG. 3 is a flow chart of a control routine for a driving force control.

Referring to the flow chart of FIG. 3, a control routine for a driving force control is described. This routine is executed at regular intervals of 10 milliseconds, for example. The sub-routine in FIG. 4 performs selection ADDFCE in response to the comparison of VSP with Vth.

At step S1 in FIG. 3, A central processor unit (CPU) of the PCM 50 inputs APO and VSP. At step S2, the CPU performs a table look-up operation of the tTd#n vs. (APO, VSP) map (see FIG. 2) using APO and VSP to determine tTd#n.

At step S3, the CPU dtermines running resistance increment RFORCE, i.e., an increment in running resistance exceeding a predetermined standard (running) resistance of the automotive vehicle.

At interrogation step S4, the CPU determines whether VSP is less than or equal to Vth. If VSP is greater than Vth (VSP>Vth), the routine proceeds to step S5. At step S5, the CPU determines ADDFCE0 by, for example, performing a table look-up operation of a predetermined map or table using RFORCE, which map or table defines a predetermined relationship between ADDFCE0 and RFORCE. At the same step S5, the CPU performs correction of tTd#n to determine tTd by adding ADDFCE0 to tT#n.

If, at step S4, VSP is less than or equal to Vth (VSP≦Vth), the routine proceeds to step S6. At step S6, the CPU sets tTd equal to tTd#n. That is, correction dependent on RFORCE is not performed and tTd#n is used uncorrected as tTd.

At step S7, an engine torque control and a ratio control are performed to realize a driving torque as high as tTd.

Figure 4:
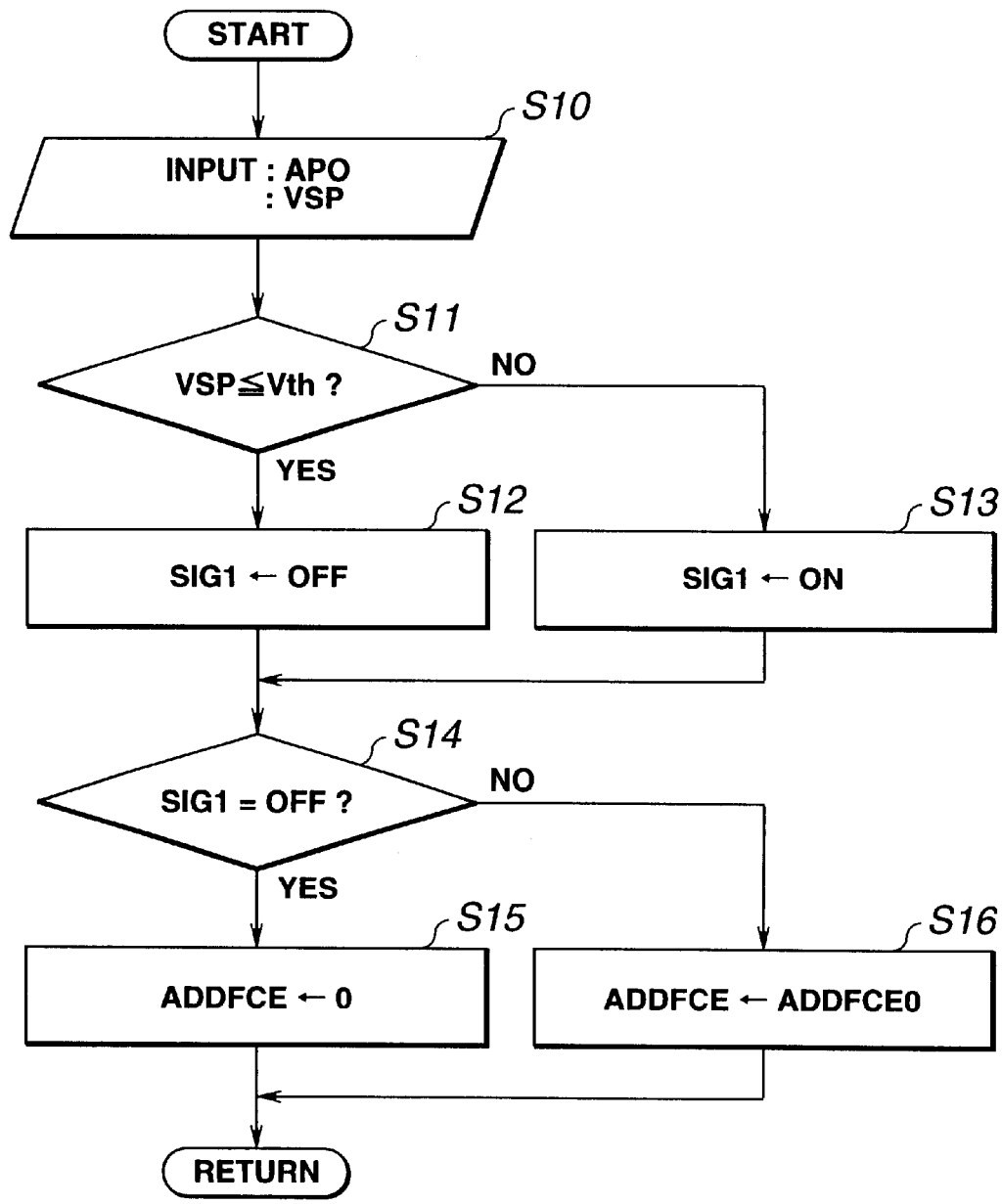
FIG. 4 is a flow chart of a control routine illustrating the first preferred implementation.

The flow chart of FIG. 4 illustrates operation of the comparator 17 and switch 19 shown in FIG. 2.

At step S10 in FIG. 4, the CPU inputs APO and VSP. At interrogation step S11, the CPU determines whether or not VSP is less than or equal to Vth. If this is the case (VSP≦Vth), the CPU sets SIG1 to OFF level at step S12. If VSP is greater than Vth (VSP>Vth), the CPU set SIG1 to ON level at step S13.

At step S14, the CPU determines whether or not SIG1 is set to OFF level. If this is the case, the routine proceeds to step S15. At step S15, the CPU sets ADDFCE equal to 0 (zero). If, at step S14, SIG1 is not a OFF level and thus at ON level, the routine proceeds to step S16. At step S16, the CPU sets ADDFCE equal to ADDFCE0.

From the preceding description, it is noted that, at low vehicle speeds (VSP≦Vth), the correction of tTd#n in response to RFORCE is prohibited. Thus, there occurs no excessive correction of tTd#n caused due to deterioration of detection performance of the vehicle speed sensor 104 at low vehicle speeds. At vehicle speeds greater than Vth, tTd#n is corrected in response to RFORCE, thus providing enhanced ride feel.

Figure 5:
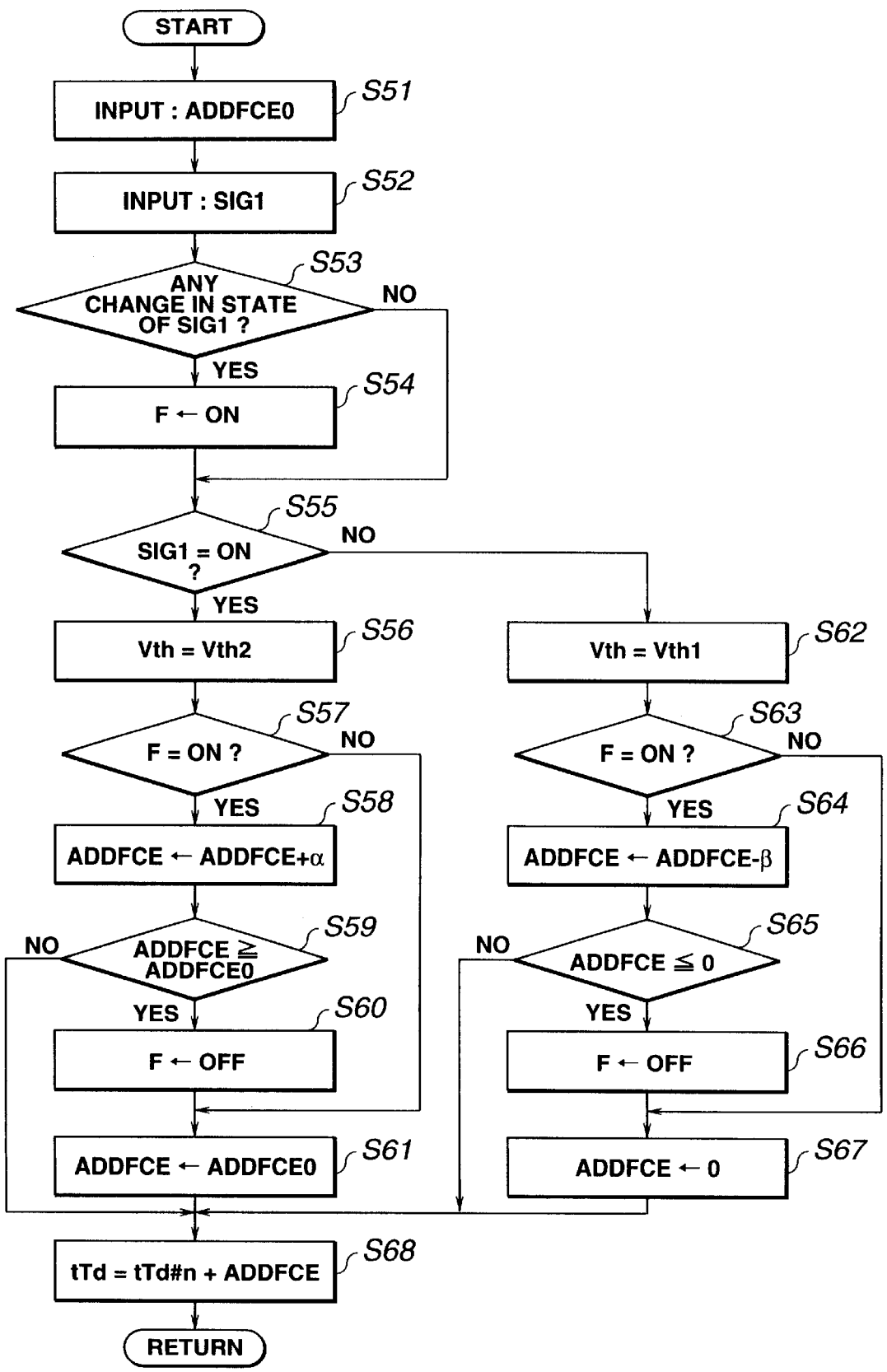
FIG. 5 is a flow chart of a control routine illustrating a second preferred implementation of the present invention.

The flow chart of FIG. 5 is a control routine illustrating the second preferred implementation of the present invention. According to the first preferred implementation, ADDFCE is subject to a step-like change between zero level and ADDFCE0 upon or immediately after a shift in state of SIG1. As different from the first preferred implementation, the second preferred implementation provides a ramp or gradual chance between zero level and ADDFCE0 and hysteresis to avoid occurrence of hunting.

The control routine shown in FIG. 5, which illustrates a modification of what is performed by the driving force correcting section 18 (see FIG. 2), is executed at regular intervals of, for example, 10 milliseconds.

At step S51 in FIG. 5, the CPU input ADDFCE0 (see FIG. 2).

Figure 8:
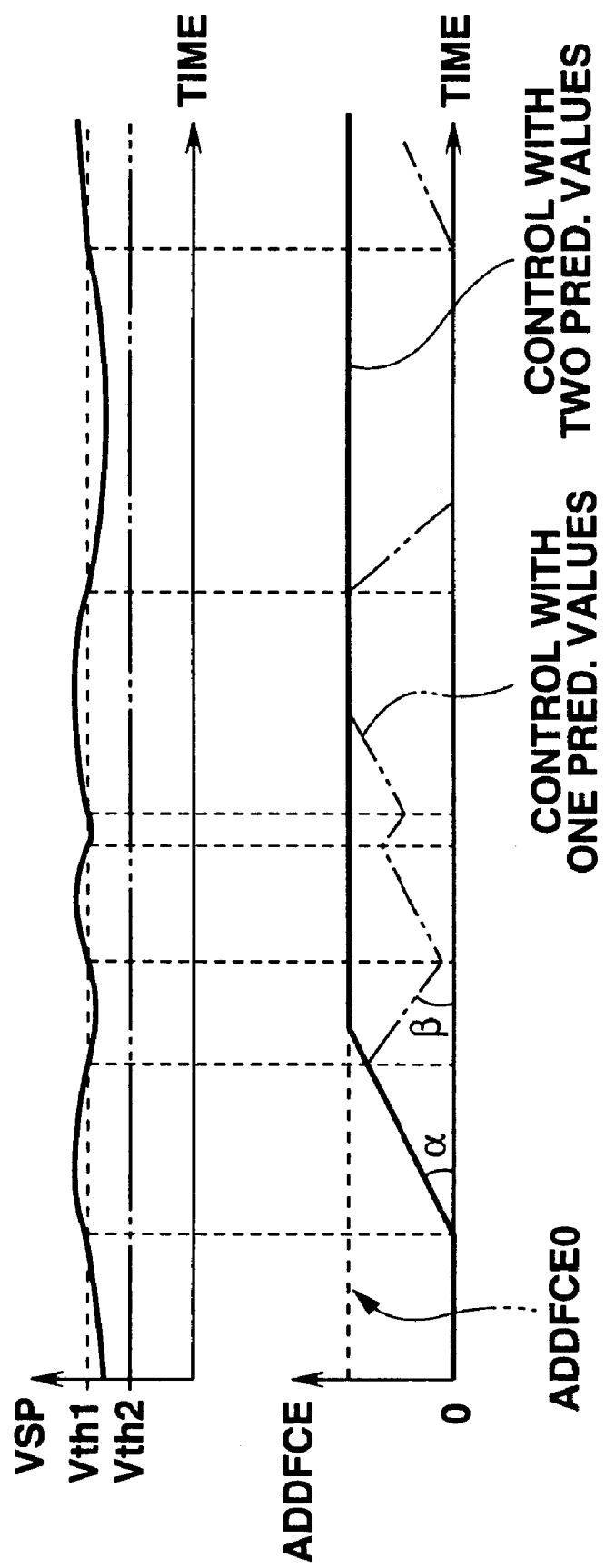
FIG. 8 is a graphical representation of variation of the target driving force correction (ADDFCE) with respect to time against variation of vehicle speed.

At step S52, the CPU inputs SIG1. SIG1 is an output of the comparator 17 (see FIG. 2) that compares VSP with Vth. According to this preferred implementation, Vth is not a fixed predetermined value and has two values, namely, a control initiation vehicle speed Vth1 and a control prohibition vehicle speed Vth2. As shown in FIG. 8, Vth1 is greater or high than Vth2 (Vth1>Vth2).

At interrogation step S53, the CPU compares the current state of SIG1 with the previous state of SIG1 to determine whether or not there has occurred any change, ON to OFF or OFF to ON, in state of SIG1. If this is the case, the routine proceeds to step S54. If this is not the case, the routine proceeds to step S55. At step S54, the CPU sets a shift flag F to ON level.

At interrogation step S54, the CPU determines whether or not the current state of SIG1 is ON level. If this is the case, the routine proceeds to step S56. This is the case immediately after VSP has exceeded Vth=Vth1. Thus, at step S56, the CPU sets Vth equal to Vth2. If the current state of SIG1 is OFF level, the routine proceeds to step S62.

After step S56, the routine proceeds to interrogation step S57. At step S57, the CPU determines whether or not F is at ON level. If this is the case, the routine proceeds to step S58. If this is not the case, the routine proceeds to step S61.

At step S58, the CPU increases ADDFCE by an increment α. Repeating step S58 gives a ramp-like increase of ADDFCE as shown in FIG. 6.

At the next step S59, the CPU determines whether or not the current value of ADDFCE is greater than or equal to the value of ADDFCE0. If this is the case, the routine proceeds to step S60. If this is not the case, the routine proceeds to step 68. At step S60, the CPU resets F equal to OFF level.

After step S60, the routine proceeds to step S61. At step S61, the CPU sets ADDFCE equal to ADDFCE0. At step S68, the CPU adds ADDFCE to tTd#n to give tTd. Engine torque control and ratio control are carried out in response to tTd.

Figure 6:
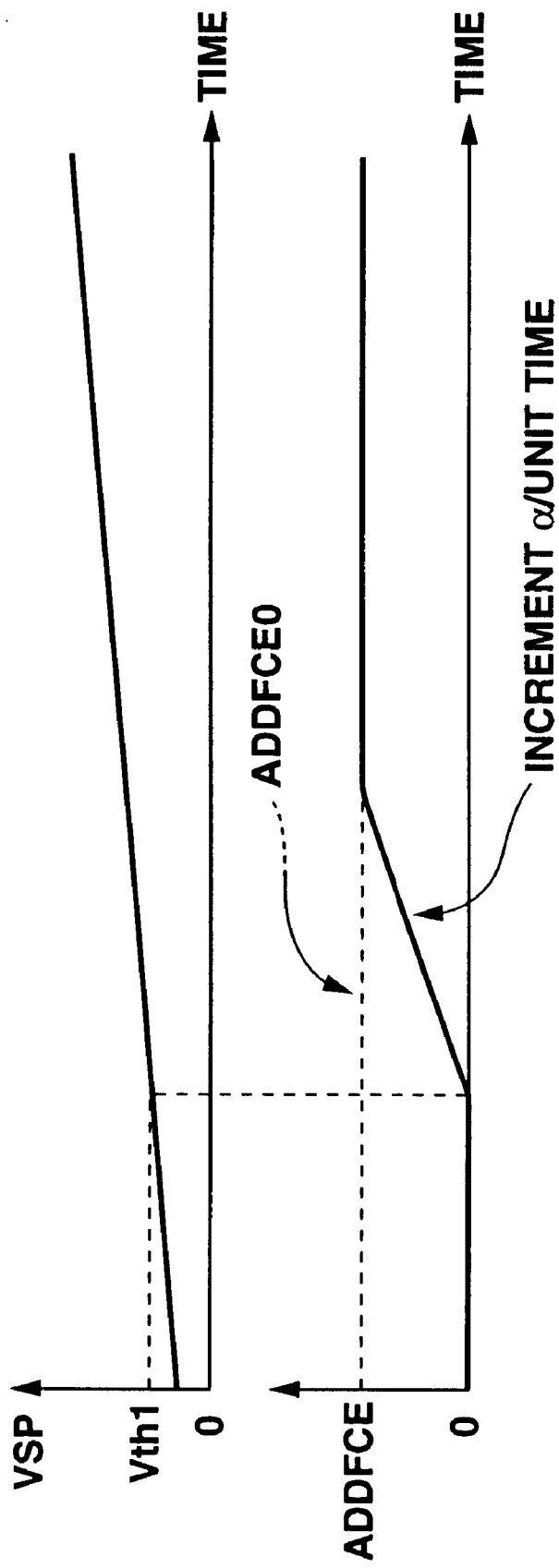
FIG. 6 is a graphical representation of variation of a target driving force correction (ADDFCE) with respect to time when vehicle speed exceeds a control initiation vehicle speed value Vth1.

Referring to FIG. 6, vehicle speed VSP increases due to acceleration of the vehicle. Upon or immediately after a moment when VSP exceeds Vth1, the control flag SIG1 shifts to ON level from OFF level, and the shift flag F to ON level from OFF level (step S54).

The driving force correction ADDFCE to be added to the ordinary target driving force tTd#n is subject to the increment α cyclically (step S58) and thus increases gradually. Subsequently, when ADDFCE reaches the preliminary driving force correction ADDFCE0 that has been determined in response to the running resistance increment RFORCE, the augmentation of ADDFCE by the increment α is completed and ADDFCE varies with ADDFCE0 (step S61).

As is now seen from the preceding description along the flow chart of FIG. 5, at acceleration, upon or immediately after vehicle speed VSP exceeds the control initiation vehicle speed Vth1, the driving force correction ADDFCE gradually increases at a rate of increment α from zero. Subsequently, ADDFCE is set equal to the preliminary driving force correction ADDFCE0. As a result, a smooth initiation of correction of driving force is made possible, without any unexpected change in driving force by the vehicle operator.

Referring back to FIG. 5, if, at step S55, the CPU determines that SIG1 is at OFF level, the routine proceeds to step S62. Since this is the case when VSP drops below the control prohibition vehicle speed Vth2, the CPU sets Vth equal to the control initiation vehicle speed Vth1 at step S62.

At the next interrogation step S63, the CPU determines whether or not F is at ON level. If this is the case, the routine proceeds to step S64. If this is not the case, the routine proceeds to step S67.

Figure 7:
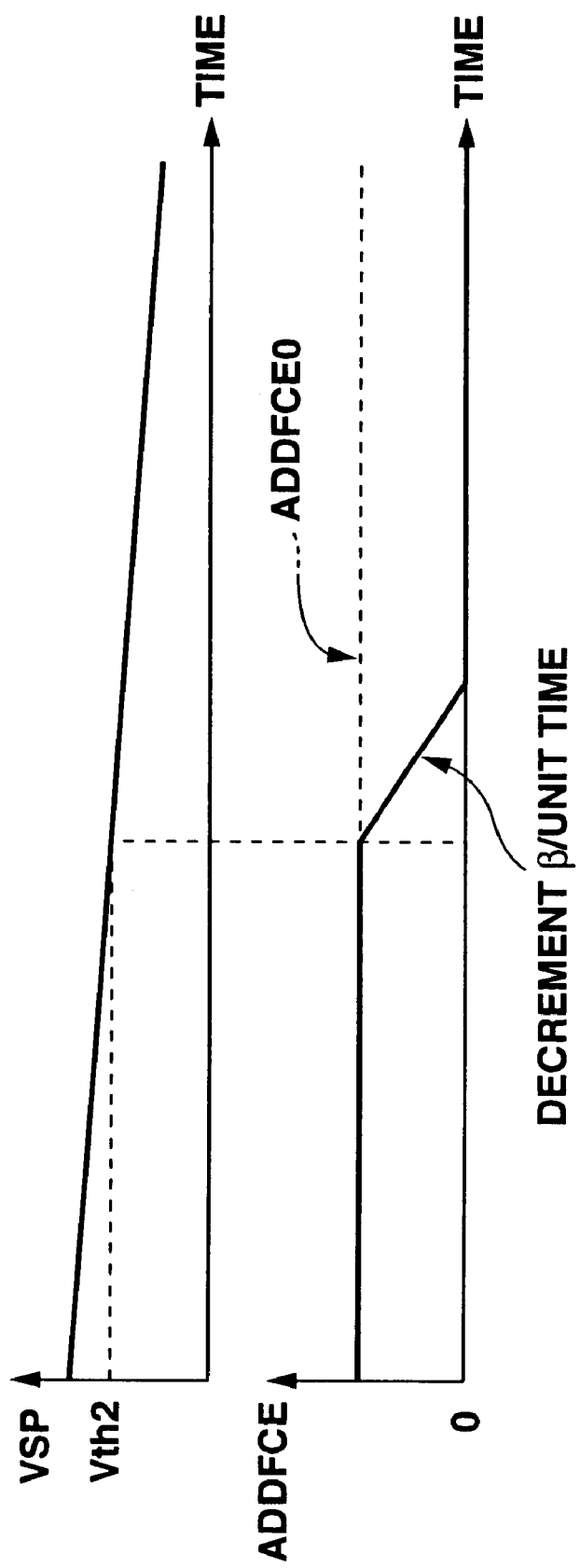
FIG. 7 is a graphical representation of variation of the target driving force correction (ADDFCE) with respect to time when vehicle speed drops below a control inhibition vehicle speed Vth2.

At step S64, the CPU decreases ADDFCE by a predetermined decrement $\beta$. Repeating step S64 provides a ramp-like decrease of ADDFCE as shown in FIG. 7. As shown in FIG. 8, the absolute value of the decrement $\beta$ is greater than the absolute value of the increment $\alpha$.

After step S64, the routine proceeds to interrogation step S65. At step S65, the CPU determines whether or not the current value of ADDFCE drops down to or below zero. If this is the case, the routine proceeds to step S66. If this is not the case, the routine proceeds to step S68. At step S66, the CPU resets F equal to OFF level.

After step S66, the routine proceeds to step S67. At step S67, the CPU sets ADDFCE equal to 0 (zero). At step S68, the CPU sets tTd equal to tTd#n, thus prohibiting correction of tTd#n in response to RFORCE.

Referring to FIG. 7, the vehicle speed VSP decreases. Upon or immediately after vehicle speed VSP drops down to or below the control prohibition vehicle speed Vth2, the control flag SIG1 shifts from ON level to OFF level, and the shift flag F shifts to ON level from OFF level (step S54).

The driving force correction ADDFCE to be added to tTd#n is subject to the decrement $\beta$ cyclically (step S64) and thus decreases gradually toward 0 (zero). Thus, the correction of driving force in response to the running resistance increment RFORCE is suppressed gradually and prohibited after ADDFCE has dropped to 0 (zero).

Since Vth has two values, Vth1 and Vth2, occurrence of hunting of ADDFCE is prevented.

In the preceding example, the correction control is prohibited after ADDFCE has dropped to 0 (zero). The invention is not limited to this example. The correction control may be prohibited after ADDFCE has dropped to any predetermined value in the neighborhood of 0 (zero).

In the preceding example, the absolute value of the increment $\alpha$ is less than the absolute value of the decrement $\beta$. At acceleration in response to operator depressing accelerator pedal, the absolute value of a has a great influence upon and $\alpha$thus determines a ride feel during correction of driving force in acceleration mode. At deceleration after operator releasing accelerator pedal, the absolute value of the decrement $\beta$ determines a ride feel during correction of driving force in deceleration mode.

At acceleration after moving off from a standstill, the vehicle operator depresses the accelerator pedal deeply, thus causing tTd#n to jump to a high level. If the absolute value of $\alpha$ is set equal to a large value, ADDFCE increases rapidly, and thus tTd increases rapidly. This rapid increase in tTd causes unexpected rapid acceleration, and thus may degrade ride feel.

Thus, the absolute value of $\alpha$ should be set equal to such a relatively small value as to provide a gradual increase in ADDFCE. This gradual increase in ADDFCE will provide a smooth acceleration expected by the vehicle operator.

At deceleration initiated by operator release of accelerator pedal, the level of tTd#n is low and thus variation in ADDFCE has little influence on ride feel. Thus, the absolute value of $\beta$ should be greater than that of $\alpha$ so as to accomplish quick change in ADDFCE in response to manipulation of the accelerator pedal.

Figure 9:
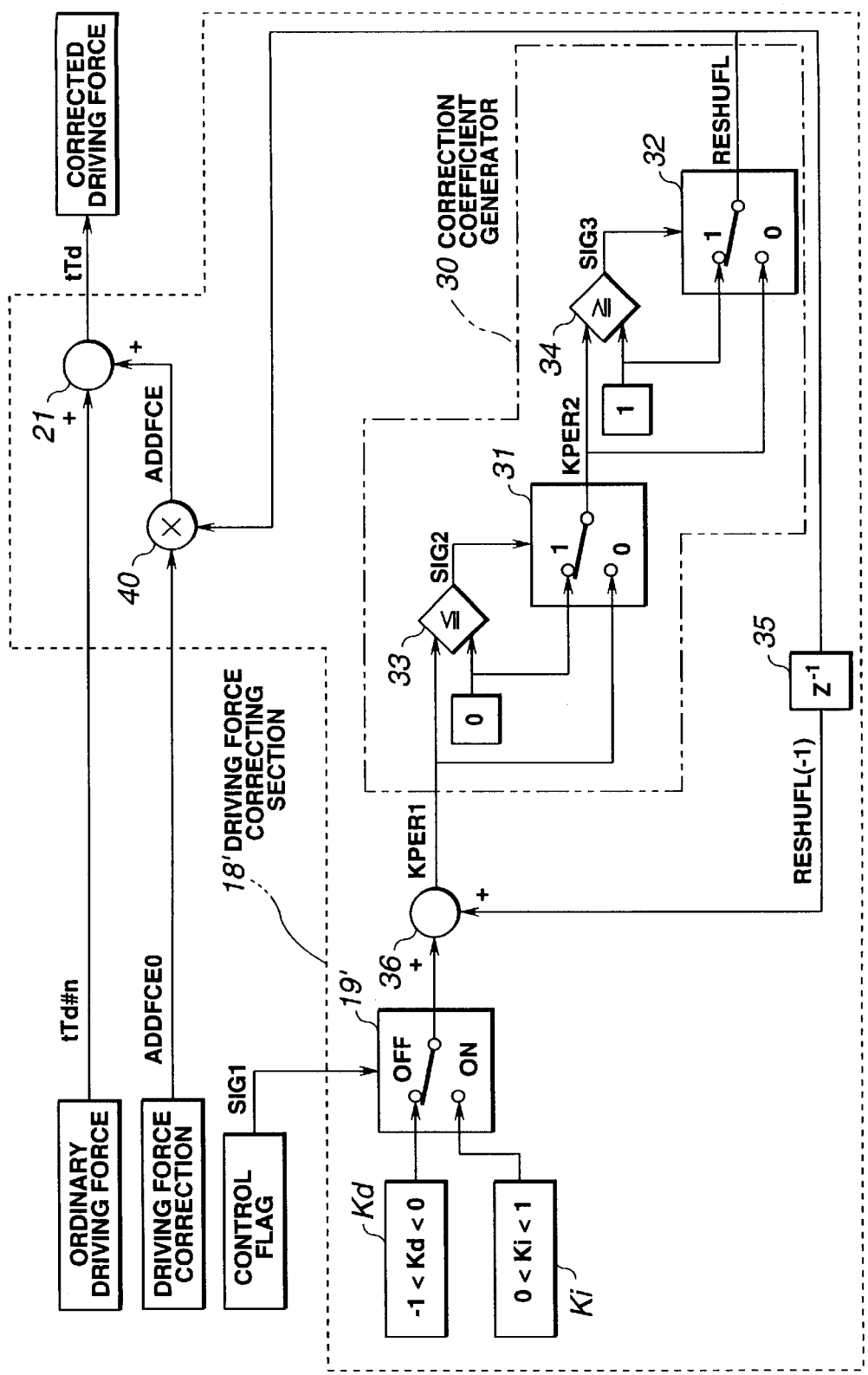
FIG. 9 is a control diagram illustrating a third preferred implementation of the present invention.
Figure 10:
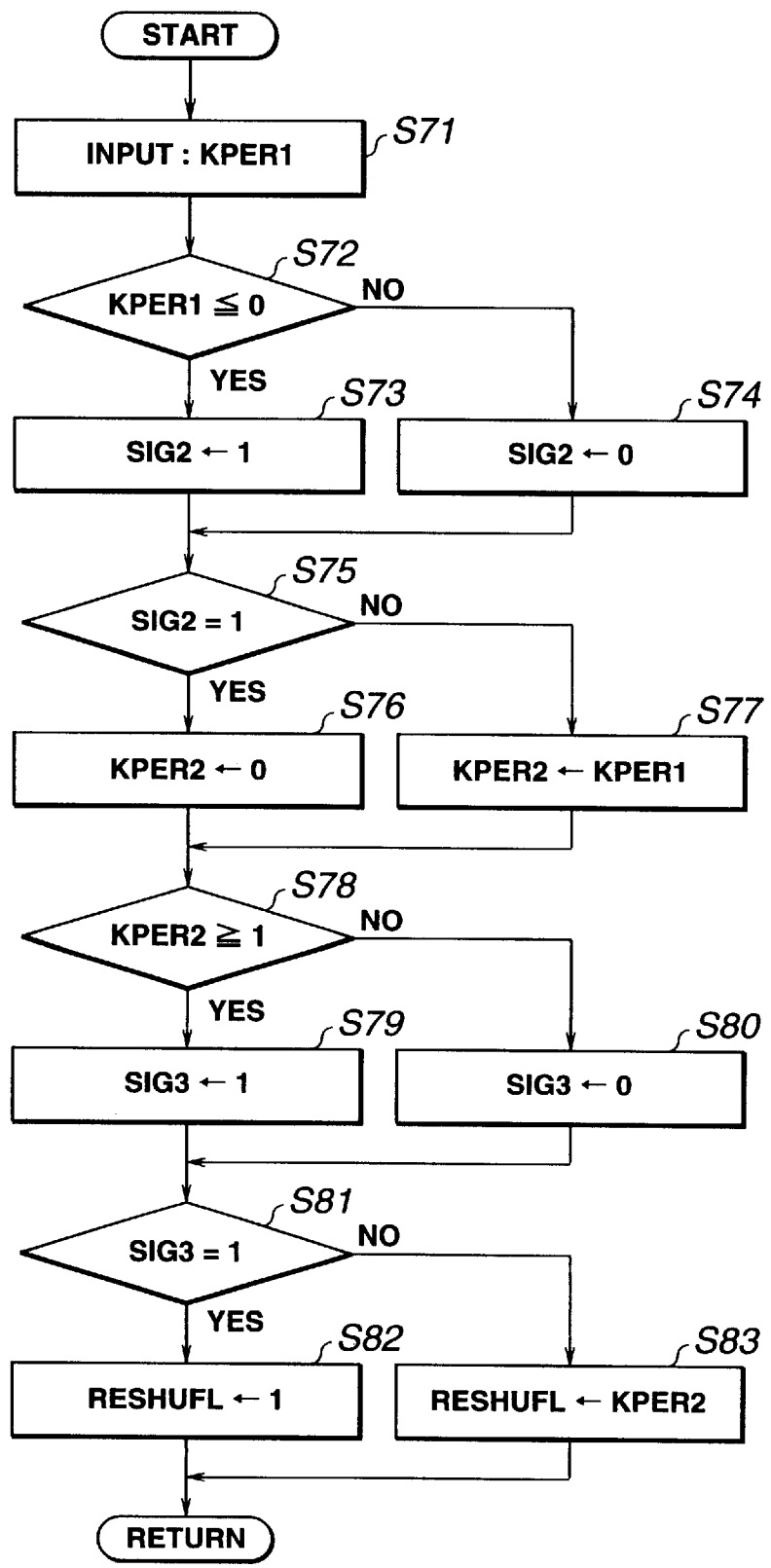
FIG. 10 is a flow chart of a control routine illustrating the third preferred implementation.

Referring to FIGS. 9 and 10, a description is made on the third preferred implementation of the present invention.

Comparing FIG. 9 with FIG. 2 reveals that the third preferred implementation is substantially the same as the first preferred implementation except the use of a new driving force correcting section (DFCS) 18' instead of the DFCS 18. Another difference resides in that Vth has two values Vth1 and Vth2 in the same manner as the second preferred implementation.

According to the DFCS 18', upon or immediately after VSP has exceeded Vth (=Vth1) at acceleration, ADDFCE increases from 0 (zero) at a gradual rate that is determined in response to a first coefficient Ki. Upon or immediately after VSP has dropped to or below Vth (=Vth2) at deceleration, ADDFCE decreases toward zero at a quick rate that is determined in response to a second coefficient Kd.

Referring to FIG. 9, the DFCS 18' includes a switch 19'. A control flag SIG1, which is an output of a comparator 17 with a reference value Vth having two values Vth1 and Vth2, is applied to the switch 19'. The first and second coefficients Ki and Kd are used as inputs to the switch 19'. The switch 19' has two positions, namely, an ON position and an OFF position. In response to ON level of SIG1, the switch 19' takes ON position, thus selecting Ki. In response to OFF level of signal SIG1, the switch 19' takes OFF position as illustrated in FIG. 9. An output of the switch 19' indicative of the selected coefficient Ki or Kd is fed as an input to a summation point 36. A preceding value of a shift in-progress correction coefficient RESHUFL(-1) is fed as other input to the summation point 36. At the summation point 36, RESHUFL(-1), is added to Ki or Kd from the switch 19' to give KPER1. KPER1, which can be expressed as KPER1=Ki (or Kd)+RESHUFL(-1), is fed as an input to a correction coefficient generator (CCG) 30. The setting is such that 0<Ki<1, −1<Kd<0, and Ki<|Kd|.

According to the second preferred implementation as illustrated in FIG. 5, variation of ADDFCE between 0 (zero) and ADDFCE0 has been controlled while F is being at ON level. As different from the second preferred implementation, the CCG 30 determines a correction coefficient RESHUFL that is variable between 0 (zero) and 1 (one) at a rate Ki or Kd.

The CCG 30 includes a first comparator 33, a first gate switch 31, a second comparator 34, and a second comparator 32. The first comparator 33 compares KPER1 with 0 (zero). The first comparator 33 determines whether or not KPER1 is less than or equal to 0 (zero). The first comparator 33 sets flag SIG2 equal to 1 (one) if KPER1 is less than or equal to zero and resets SIG2 equal to 0 (zero) if KEPR1 is greater than zero. In response to SIG2, the first gate switch 31 sets KPER1 as KPER2 if SIG2 is 0, and sets 0 (zero) as KPER2 if SIG2 is 1.

The second comparator 34 determines whether or not KPER2 is greater than or equal to 1 (one). The second comparator 34 sets flag SIG3 equal to 1 (one) if KPER2 is greater than or equal to 1 and resets SIG3 equal to 0 (zero) if KPE2 is less than zero. In response to SIG3, the second gate switch 32 sets KPER2 as RESHUFL if SIG3 is 0, and sets 1 as RESHUFL if SIG3 is 1.

A delay 35 is disposed between the switch 32 and the summation point 36 to provide the preceding value RESHUFL(-1) to the switch 32.

FIG. 10 is a flow chart of a control routine illustrating operation of the correction coefficient generator 30.

At step S71, the CPU inputs KPER1 from the summation point 36. At interrogation step S72, the CPU determines whether or not KPER1 is less than or equal to 0. If this is the case, the CPU sets SIG2 equal to 1 at step S73. If this is not the case, the CPU reset SIG2 equal to 0 at step S74.

At the next interrogation step S75, the CPU determines whether or not SIG2 is equal to 1. If this is the case, the CPU sets 0 as KPER2 at step S76. If this is not the case, the CPU sets KPER1 as KPER2 at step S77. The jobs at steps S71, S72, S73, S74, S75, S76, and S77 correspond to operation of the first comparator 33 and the first gate switch 31.

At interrogation step S78, the CPU determines whether or not the CPU is greater than or equal to 1. If this is the case, the CPU sets SIG3 equal to 1 at step S79. If this is not the case, the CPU resets SIG3 equal to 0 at step S80.

At the next interrogation step S81, the CPU determines whether or not SIG3 is equal to 1. If this is the case, the CPU sets 1 as RESHUFL at step S82. If this is not the case, the CPU sets KPER2 as RESHUFL at step S83. The jobs at steps S78, S79, S80, S82, and S83 correspond to operation of the second comparator 34 and the second gate switch 32.

In the preceding example, the first and second coefficients Ki and Kd are kept unaltered. One or both of these coefficients Ki and Kd may be varied with respect to time, if desired.

In the preceding description, the running resistance increment generator (RRIG) 14 is described briefly in connection with FIG. 2. For full understanding of the PRIG 14, reference should be made to a pending U.S. patent application No. 09/513,459, filed by the inventors, entitled "Process of Forming Standard Resistance Values and Vehicle Control Using Same", and claims priority based on Japanese Patent Application NO. 11-58291 filed in Japan on Mar. 5, 1999. This pending U.S. patent application is hereby incorporated by reference in its entirety and commonly assigned herewith. Particular reference is made to FIG. 2 illustrating a driving torque generator (DTG) 2, a standard resistance generator 3, and a summation point to make subtraction of RLDTRQ from TRQALL to give RESTRQ. This RESTRQ corresponds to RFORCE that is generated by the RRIG 14 used in this application. Particular reference is also made to a driving force correction generator (DFCG) 41 and its description of the incorporated U.S. patent application. This DFCG 41 corresponds in operation to the DFCG 16 used in this application.

The above-identified U.S. patent application, which has been incorporated by reference, has a corresponding European Patent Application that claims priority based on Japanese Patent Application NO. 11-58291.

While the present invention has been particularly described, in conjunction with the preferred embodiments, it is evident that many alternatives, modifications and variations will be apparent to those skilled in the art in light of the foregoing description. It is therefore contemplated that the appended claims will embrace any such alternatives, modifications and variations as falling within the true scope spirit of the present invention.

The content of disclosure of Japanese Patent Application No. 11-60181, filed Mar. 8, 1999 is hereby incorporated by reference in its entirety.

What is claimed is:

1. A driving force control system for an automotive vehicle having an accelerator pedal and a powertrain including an internal combustion engine, comprising:

a vehicle speed sensor detecting an operating parameter indicative of a speed of the vehicle and generating a vehicle speed signal indicative of said detected operating parameter;

an accelerator pedal depression sensor detecting an amount of depression of the accelerator pedal by the vehicle operator and generating an accelerator pedal opening signal indicative of said detected amount of depression;

an ordinary target driving force generator determining an ordinary target driving force in response to said amount of depression of the accelerator pedal by the vehicle operator as indicated by said accelerator pedal opening signal and said vehicle speed indicated by said vehicle speed signal and generating an ordinary target driving force signal indicative of said determined ordinary target driving force, said ordinary target driving force being a predetermined target value of dirving force required to keep the vehicle rolling over the surface of a flat road that has 0% gradient;

a running resistance increment generator determining an increment in running resistance from a standard resistance that is indicated by said ordinary target driving force and generating a running resistance increment signal indicative of said determined increment in running resistance;

a corrected target driving force generator receiving said ordinary target driving force signal, said vehicle speed signal and said running resistance increment signal, said corrected target driving force generator being operative to determine whether or not said vehicle speed signal is in a predetermined state, said corrected ordinary driving force generator being operative to generate a corrected target driving force signal by correcting said ordinary target driving force signal based on said running resistance increment signal upon determination that said vehicle speed signal is outside of said predetermined state, said corrected ordinary driving force generator being operative to keep setting said ordinary target driving force signal as said corrected target driving force signal upon determination that said vehicle speed signal is in said predetermined state.

2. The driving force control system as claimed in claim 1, wherein said corrected target driving force generator includes:

a driving force correction generator determining a correction amount in driving force in response to said running resistance increment signal and generating a preliminary driving force correction signal indicative of said determined correction amount;

a driving force correcting section receiving said preliminary driving force correction signal, determining a driving force correction, and generating a driving force correction signal indicative of said determined driving force correction, said driving force correction having at least a first level as high as said preliminary driving force correction and a second level in the neighborhood of zero, said driving force correcting section including a summation point at which said driving force correction signal is added to said ordinary target driving force signal to give said corrected target driving force signal, said driving force correcting section being operative to keep setting said second level as said driving force correction when said vehicle speed signal in said predetermined state.

3. The driving force control system as claimed in claim 2, wherein said corrected target driving force generator is operative to determine whether or not said vehicle speed signal is less than or equal to a predetermined reference that has a control initiation vehicle speed value and a control prohibition vehicle speed value, said control initiation vehicle speed value being higher than said control prohibition vehicle speed value, and wherein said corrected target driving force generator is operative to generate a state indicative signal indicative of the fact that said vehicle speed signal is in said predetermined state upon determination that said vehicle speed signal is less than or equal to said predetermined reference.

4. The driving force control system as claimed in claim 3, wherein said corrected target driving force generator is operative to change setting of said predetermined reference from said control initiation vehicle speed value to said control prohibition vehicle speed value after said vehicle speed signal has exceeded said predetermined reference, and subsequently change the setting of said predetermined reference from said control prohibition vehicle speed value to said control initiation vehicle speed value after said vehicle speed signal drops to or below said predetermined reference.

5. The driving force control system as claimed in claim 4, wherein said driving force correcting section is operative to keep setting said second level as said driving force correction when said state indicative signal appears, and to change setting of said driving force correction form said second level to said first level immediately after said state indicative signal has disappeared.

6. The driving force control system as claimed in claim 4, wherein said driving force correcting section is operative to keep setting said first level as said driving force correction when said state indicative signal disappears, and to change setting of said driving force correction form said first level to said second level immediately after said state indicative signal has appeared.

7. The driving force control system as claimed in claim 4, wherein said driving force correcting section is operative to increase setting of said driving force correction from said second level to said first level at a rate determined by a predetermined increment after said sate indicative signal has disappeared.

8. The driving force control system as claimed in claim 7, wherein said driving force correcting section is operative to decrease setting of said driving force correction from said first level to said second level at a rate determined by a predetermined decrement after said sate indicative signal has appeared.

9. The driving force control system as claimed in claim 8, wherein said increment is set such that said driving force correcting gradually increase from said second level to said first level, and said decrement is set such that said driving force correction decreases quickly from said first level to said second level.

10. The driving force control system as claimed in claim 9, wherein the absolute value of said decrement is greater than the absolute value of said increment.

11. The driving force control system as claimed in claim 4, wherein said driving force correcting section is operative to set a portion of said first level as said driving force correction immediately after said state indicative signal disappeared, and to increase said portion at a rate determined by a first predetermined coefficient that falls between 0 and 1.

12. The driving force control system as claimed in claim 11, wherein said driving force correcting section is operative to set a portion of said first level as said driving force correction immediately after said state indicative signal has appeared, and to decrease said portion at a rate determined by a second predetermined coefficient that falls between −1 and 0.

13. A driving force control system for an automotive vehicle having an accelerator pedal and a powertrain including an internal combustion engine, comprising:

a vehicle speed sensor detecting an operating parameter indicative of a speed of the vehicle and generating a vehicle speed signal indicative of said detected operating parameter;

an accelerator pedal opening sensor detecting amount of depression of the accelerator pedal by the vehicle operator and generating an accelerator pedal opening signal indicative of said detected amount of depression;

an ordinary target driving force generator determining an ordinary target driving force in response to said amount of depression of the accelerator pedal by the vehicle operator as indicated by said accelerator pedal opening signal and said vehicle speed indicated by said vehicle speed signal and generating an ordinary target driving force signal indicative of said determined ordinary target driving force, said ordinary target driving force being a predetermined target value of driving force required to keep the vehicle rolling over the surface of a flat road has 0% gradient;

a running resistance increment generator determining an increment in running resistance from a standard resistance that is indicated by said ordinary target driving force and generating a running resistance increment signal indicative of said determined increment in running resistance;

a corrected target driving force generator receiving said ordinary target driving force signal, said vehicle speed signal and said running resistance increment signal, said corrected target driving force generator being operative to determine whether or not said vehicle speed signal is less than or equal to a predetermined reference that has a control initiation vehicle speed value and a control prohibition vehicle speed value and generate a state indicative signal indicative of the fact that said vehicle speed is in a predetermined state upon determination that said vehicle speed signal is less than or equal to said predetermined reference, said control initiation vehicle speed value being higher than said control prohibition vehicle speed value, said corrected target driving force generator being operative to change setting of said predetermined reference from said control initiation vehicle speed value to said control prohibition vehicle speed value after said vehicle speed signal has exceeded said predetermined reference, and subsequently change the setting of said predetermined reference from said control prohibition vehicle speed value to said control initiation vehicle speed value after said vehicle speed signal drops to or below said predetermined reference, said corrected target driving force generator being operative to generate a corrected target driving force signal by correcting said ordinary target driving force signal based on said running resistance increment signal when said state indicative signal disappears, said corrected target driving force generator being operative to keep setting said ordinary target driving force signal as said corrected target driving force signal when said state indicated signal appears.

* * * * *